United States Patent
Cleve

(10) Patent No.: US 8,879,720 B2
(45) Date of Patent: Nov. 4, 2014

(54) ACOUSTIC ECHO CANCELLATION USING A VARIABLE LENGTH ADAPTIVE FILTER

(71) Applicant: RevoLabs, Inc., Sudbury, MA (US)

(72) Inventor: Pascal Cleve, Sudbury, MA (US)

(73) Assignee: RevoLabs, Inc., Sudbury, MA (US)

( * ) Notice: Subject to any disclaimer, the term of this patent is extended or adjusted under 35 U.S.C. 154(b) by 0 days.

(21) Appl. No.: 13/844,998

(22) Filed: Mar. 17, 2013

(65) Prior Publication Data

US 2014/0270148 A1 Sep. 18, 2014

(51) Int. Cl.
*H04M 9/08* (2006.01)
*H04M 3/00* (2006.01)
*H04B 3/23* (2006.01)

(52) U.S. Cl.
CPC ........ *H04M 3/002* (2013.01); *H04B 3/23* (2013.01)
USPC ................................. 379/406.04; 379/406.08

(58) Field of Classification Search
CPC ...................................................... H04M 9/085
USPC .................................... 379/406.04, 406.08
See application file for complete search history.

(56) References Cited

U.S. PATENT DOCUMENTS

| 6,687,373 B1* | 2/2004 | Yeh et al. ........... 379/406.08 |
| 6,731,691 B2* | 5/2004 | Agazzi et al. ............ 375/285 |
| 7,925,008 B2* | 4/2011 | Hirai et al. ......... 379/406.08 |
| 8,280,037 B2* | 10/2012 | Takada ............. 379/406.08 |
| 2004/0174991 A1* | 9/2004 | Hirai et al. ......... 379/406.08 |

* cited by examiner

*Primary Examiner* — Alexander Jamal
(74) *Attorney, Agent, or Firm* — Robert Schuler

(57) ABSTRACT

An audio conferencing system having a base station, a loud speaker and one or more microphones generally operates to receive a F.E. audio signal, play the signal, and to receive a N.E. audio signal at the microphone that includes the F.E. audio signal modified by an echo path and a N.E. audio signal. The base station includes an adaptive filter whose length is controlled to be variable depending upon activity detected at each of one or more filter elements comprising the adaptive filter.

13 Claims, 6 Drawing Sheets

ACOUSTIC ECHO CANCELLATION USING A VARIABLE LENGTH ADAPTIVE FILTER

1. FIELD OF THE INVENTION

The present disclosure relates to an audio conferencing system that employs a dynamic, variable length adaptive filter to remove acoustic echo from an audio signal in a changing acoustic environment.

2. BACKGROUND

Meetings between multiple individuals conducted in two or more separate locations can be facilitated using audio conferencing systems. An audio conferencing system typically includes some number of microphones, at least one loudspeaker and a base station which is connected to a public network. In such a system, microphones can operate to pick up near end (N.E.) acoustic audio signals (speech) from an individual and transmit the audio signals to a base station which generally operates to provide session control and to process the audio signals in a number of ways before sending it to a far end (F.E.) communication device to be played by a loudspeaker. Among other things, the base station can be configured with functionality to amplify audio signals, it can regulate microphone signal gain (automatic gain control or AGC), suppress noise, and it can remove acoustic echo present in an audio signal transmitted to a F.E. system.

FIG. 1 is a diagram showing functional elements comprising a typical audio conference system 100. The system 100 can be comprised of one or more microphones 11, one or more loudspeakers 13, and a base station 15. The base station 15 generally includes complex digital signal processing and audio signal control functionality. The audio signal control can include functionality to automatically control near side audio signal gain, functionality to control microphone sensitivity, and system mode control (duplex/half duplex modes) to name only a few, and the digital signal processing can include acoustic echo cancellation (AEC) functionality, residual echo suppression functionality or other non-linear processing, noise cancellation functionality and double talk detection and mitigation.

AEC is an essential function performed by audio conferencing systems, and it generally operates to remove acoustic echo from a N.E. audio signal prior to the signal being transmitted to a remote or F.E. system. Specifically, acoustic echo occurs when a F.E. audio signal, received and played by a N.E. system loud speaker, is picked up by a microphone proximate to the loud speaker. An audio signal captured by the near side microphone will include at least some of the F.E. audio signal information, and this audio information can be transmitted back to F.E. end system where it can be heard as an echo. This acoustic echo is distracting and can severely degrade the quality of an audio conferencing session if it is not cancelled.

Continuing to refer to FIG. 1, the base station 15 is comprised of an adaptive filter 20 and a summation function 22. In operation, a F.E. audio signal $X_N$ is received at the system 100 and sent to both the loudspeaker 13 and to the adaptive filter 20 which operates to, among other things, use the input signal $X_N$ and an error signal E to calculate an estimated echo signal $\hat{h}$ which is sent to the summation function 22. The F.E. audio signal $X_N$ sent to the loudspeaker is played, and the microphone proximate to the loudspeaker can receive an audio signal h that includes $X_N$ signal audio information transformed by an echo path that exists between the loud speaker and the microphone. This echo path can be modeled as a room impulse response, which in this case is represented by an acoustic signal $h_N$. A N.E. audio signal $V_N$ (generate by one or more individual speaking into a N.E. microphone), and signals played by the loud speaker and reflected to the microphone, referred to here as a reflected signal $S_N$, are combined into a microphone signal $Y_N$ and send to the summation function 22. The summation function 22 generally operates to subtract the estimated echo signal $\hat{h}$ from the microphone signal $Y_N$ which results in an error signal E that serves as an input to the adaptive filter 20 and which can be transmitted to a F.E. audio system. More specifically, the error signal is an input to an adaptive algorithm comprising the adaptive filter 20 and is employed by the adaptive algorithm to calculate a set of coefficients W. The coefficients calculated by the adaptive algorithm are used by the filter 20 to operate on the F.E. signal $X_N$ to generate the estimated echo signal $\hat{h}$. The objective of the adaptive algorithm is to calculate or update filter coefficients such that the adaptive filter is able to minimize the error signal value, which in an ideal case is zero.

An adaptive filter suitable for operating to cancel acoustic echo in an audio system is typically designed to have a fixed number of filter elements or taps so that it is able to converge to a solution (which is the minimization of an error signal) within a reasonable period of time. Such an adaptive filter is shown with reference to FIG. 2. In an ideal acoustic environment (i.e., there is no reflected signal energy), a microphone signal $Y_N$ may only capture energy received directly (non-reflected) from a loudspeaker. In this case, such a fixed length adaptive filter can operate effectively to cancel substantially all of an acoustic echo component in a microphone signal. However, if a microphone signal includes a reflected acoustic energy component ($S_N$) in addition to the non-reflected acoustic energy, an adaptive filter may not be able to converge to a solution within a reasonable period of time, if ever. The period of time that audio signal reflections ($S_N$) linger is largely dependent upon the characteristics of the environment in which an audio system is operating. So, for instance, if a room in which an audio system is operating is relatively large, or the surfaces comprising the room are composed of materials that readily reflect acoustic signals, a signal $X_N$ played by a loud speaker can reflect from more than one room surface before being received by a microphone. Given a large room with many reflective surfaces, a reflected acoustic signal can be received at a microphone up to several hundred milliseconds after the signal from which it originates is played by a loud speaker. So, for example, an audio signal $X_N$ played by a loud speaker at time T.1 can be received by a microphone in an unreflected form at time T.2, and the microphone can receive a one or more reflected audio signal corresponding to the signal $X_N$ at times T.3 to T.n until the amplitude of the reflected signal is less than a threshold sensitivity level of the microphone. Given the wide variety of environments in which an audio system can operate, designing one adaptive filter to effectively cancel acoustic echo in all environments is a daunting task. As such, adaptive filters are typically designed for particular environments such that they are able to converge to a solution within a reasonable period of time. One factor contributing to an adaptive filters convergence time is filter length. Filter length according to this description can mean the number of filter elements comprising an adaptive filter in the frequency domain, or the number of filter taps comprising an adaptive filter in the time domain. For instance, in FIG. 2, the adaptive filter 200 has $\hat{h}_N$ filter elements or taps and so can be said to have a length of "N", where N is an integer value.

Adaptive filters can be designed with a greater number of taps for use in audio systems operating in relatively large rooms and/or in rooms with highly reflective surfaces, and adaptive filters can be designed with fewer numbers of taps for use in audio systems operating in relatively smaller rooms and/or in rooms with surfaces that do not readily reflect acoustic signal energy. As it is difficult to design an adaptive filter that is able to effectively remove acoustic echo in a wide range of environments, the audio signal resulting from the adaptive filtration process can be subjected to various forms of non-linear signal processing (NLP), such as the NLP 310 shown with reference to FIG. 3. Typically, this non-linear filtering process operates to suppress the audio level/energy comprising an audio signal in selected frequency spectra prior to transmitting the audio signal to a F.E. system.

3. BRIEF DESCRIPTION OF THE DRAWINGS

The present invention can be best understood by reading the specification with reference to the following figures, in which.

4. DETAILED DESCRIPTION

While adaptive filters of differing fixed lengths are designed to operate in specific range of environmental conditions, it is difficult to design an adaptive filter that is able to effectively remove acoustic echo under all environmental conditions and to converge to a solution within a reasonable period of time. As a consequence, non-linear filtration is typically performed on the output of an adaptive filter in order to suppress residual acoustic echo. Unfortunately, the application of non-linear filtration not only suppresses residual acoustic echo, but it can also suppress audio in a signal generated by a local talker that is to be transmitted to a F.E. audio system to be played. Depending upon the degree of suppression, some or most of an audio signal generated at a N.E. can be suppressed, which results in the N.E. audio system operating in what is essentially a half-duplex mode where only a F.E. audio signal can be played and heard at the N.E. system at any point in time.

An adaptive filter is described hereinafter that overcomes the environmental limitations imposed by current fixed length adaptive filter designs. This adaptive filter can be controlled to activate or deactivate filter elements in real time in response to a changing acoustic environment in which it is operating. The ability of this adaptive filter to cancel acoustic echo is not limited by the size of a room in which it is operating, it is not limited by the reflective properties of the room surfaces, and it is not limited in the presence of a changing acoustical environment. In one embodiment, this adaptive filter can operate to detect and quantify an audio signal parameter associated with an output signal (i.e., the estimated echo energy value $\hat{h}_N$) of at least one of a plurality of adaptive filter elements comprising the adaptive filter, and depending upon the quantified output signal value of the audio signal detected, the adaptive filter can be controlled to activate or deactivate one or more filter elements, thereby increasing or decreasing the adaptive filter's length as needed to cancel substantially all of an acoustic echo. Further, this adaptive filter can operate to only calculate coefficients for each adaptive filter element that is currently active. An adaptive filter designed to operate in this manner is able to operate in a full-duplex mode under virtually any environmental condition, and is able to converge to a solution in an optimum period of time given any environmental condition. An adaptive filter that operates according to the preceding principles is described below with reference to FIG. 4.

Figure 1:
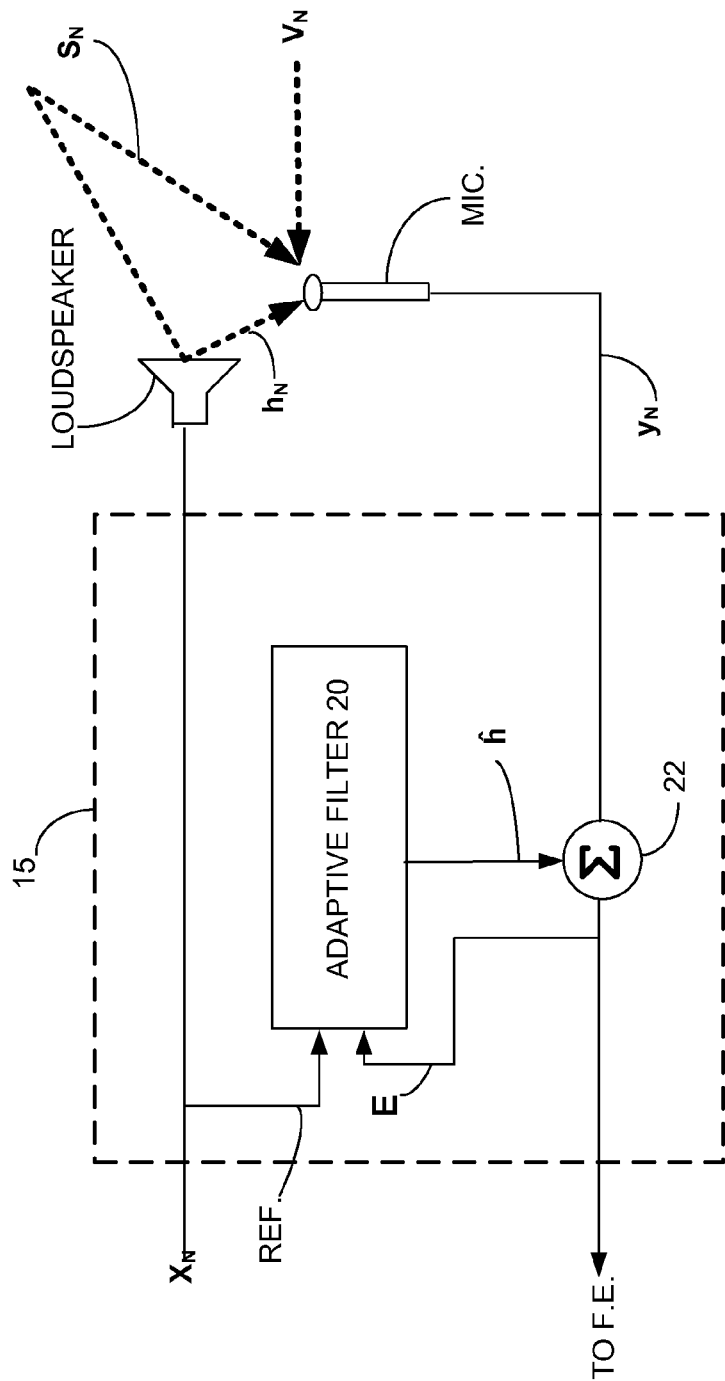
FIG. 1 is a diagram showing functional elements comprising an audio system 100.
Figure 2:
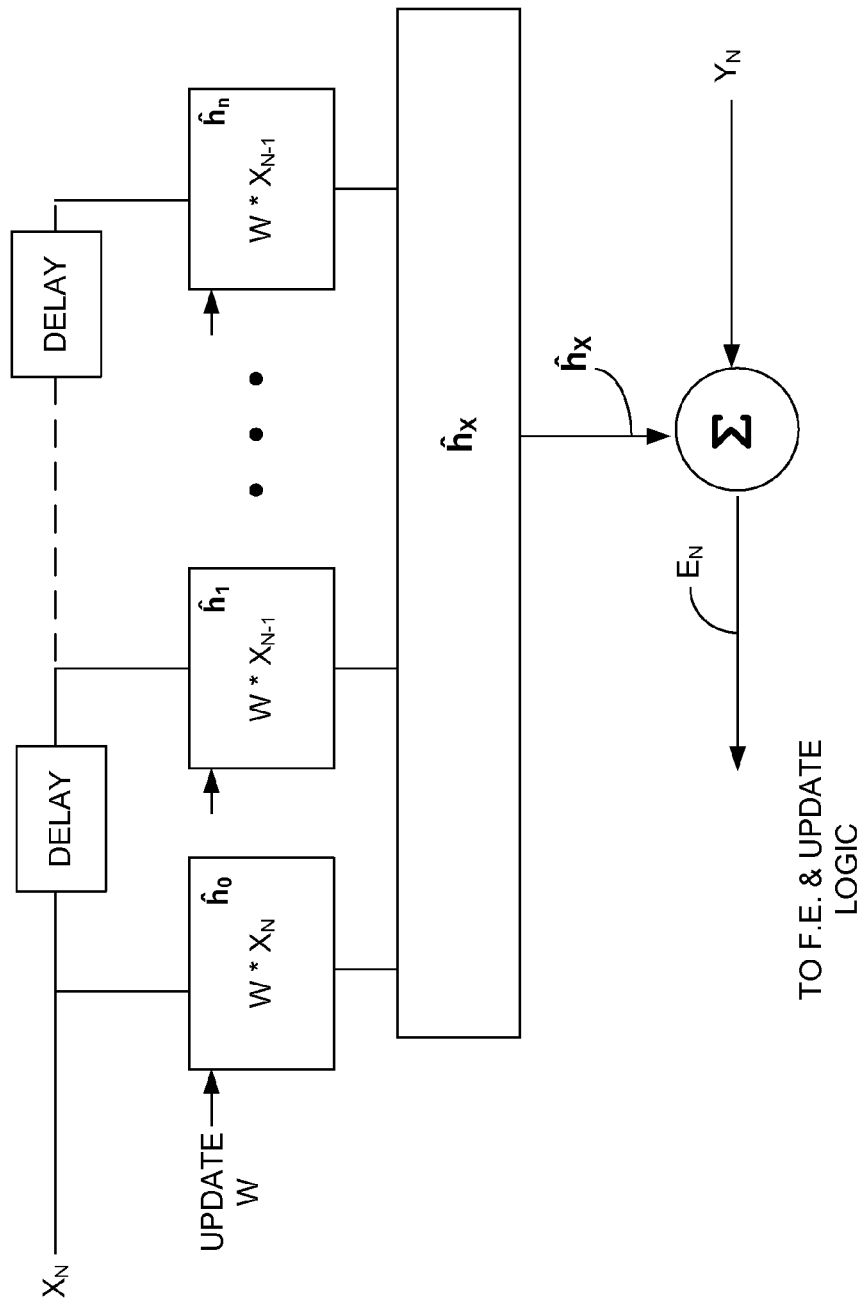
FIG. 2 is a diagram showing a fixed length adaptive filter 200.
Figure 3:
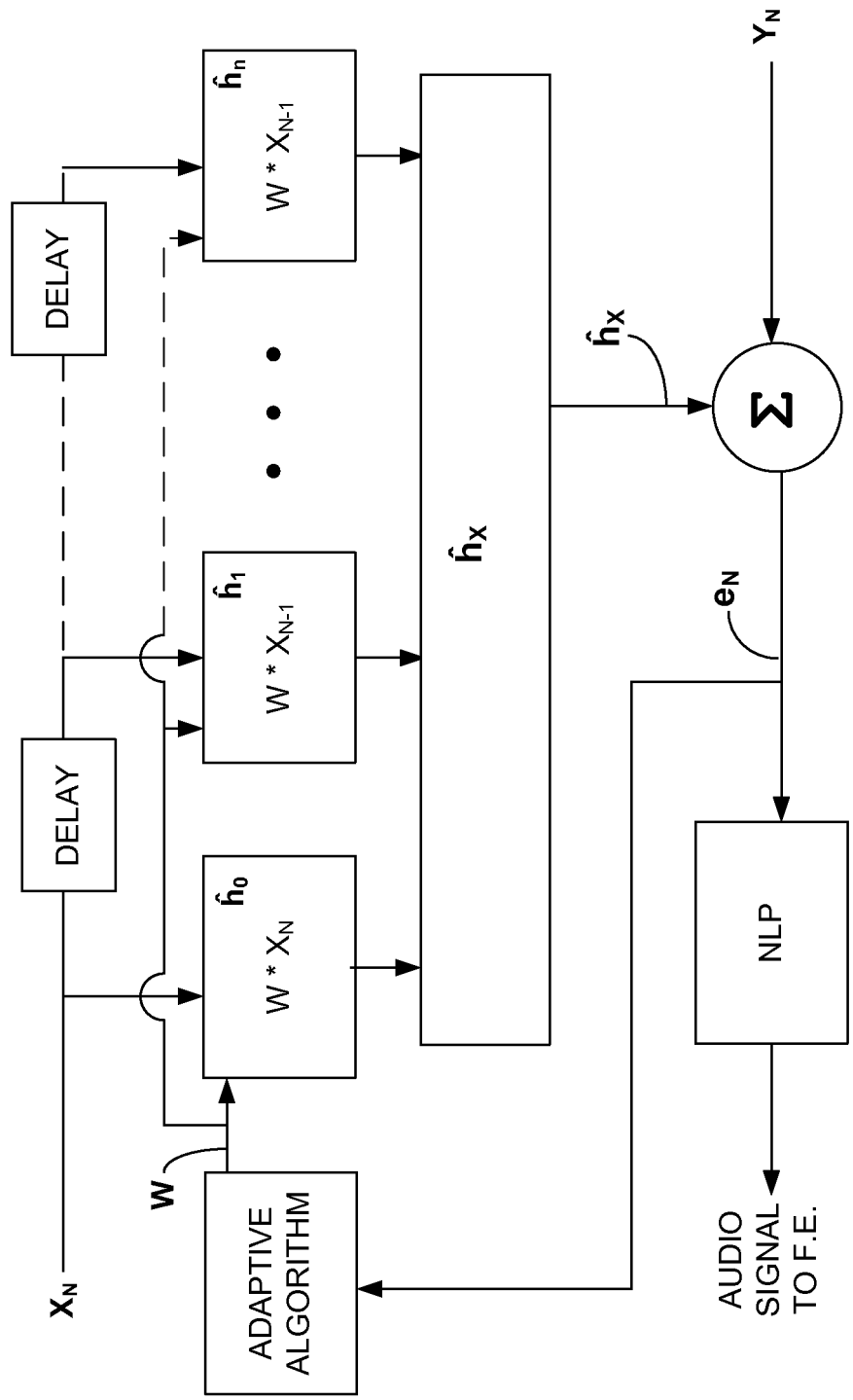
FIG. 3 is a diagram showing a fixed length adaptive filter 300.
Figure 4:
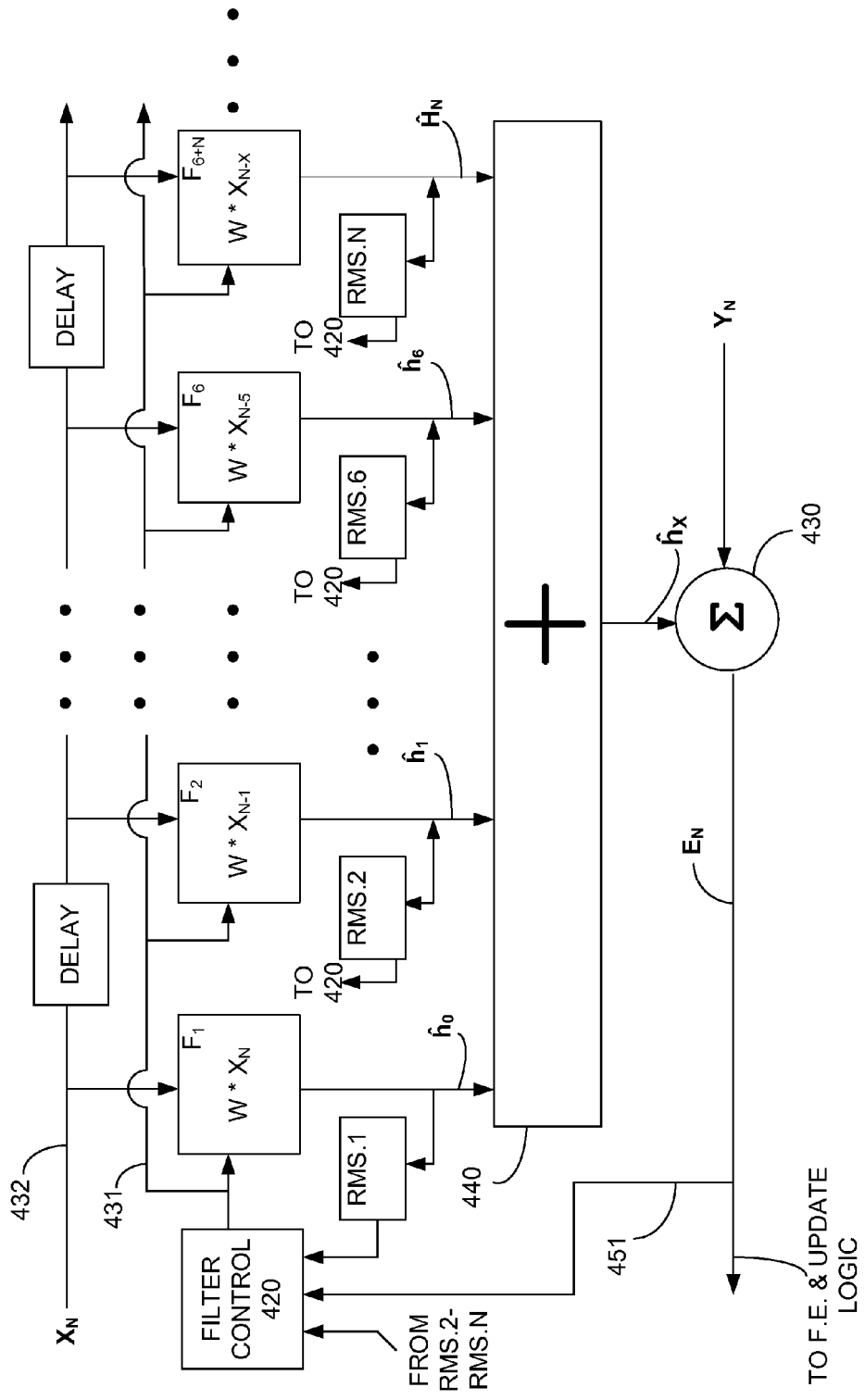
FIG. 4 is a diagram showing a variable length adaptive filter according to one embodiment of the invention.

FIG. 4 is a diagram showing an embodiment of an adaptive filter 400 comprising an audio conferencing system which is similar to the system 100 described with reference to FIG. 1 (with the exception of the design of the adaptive filter 400). Generally, the adaptive filter 400 has a plurality of filter elements as $F_1$ to $F_{6+N}$, with "N" being an integer, each of which can be controlled to be active or inactive at any point in time according to a filter element activity parameter detected and quantified at each on or one or more of the active filter elements. This filter element activity parameter can be a RMS (root mean square) value detected at the output of a filter element, it can be a audio signal vector value or it can be any other detectable and quantifiable audio signal parameter suitable for determining a level of activity at a filter element.

In addition to the filter elements $F_1$ to $F_{6+N}$ described above, adaptive filter 400 has a plurality of delay elements in a line 432, each of which represents a time delay to shift the signal $X_N$ (or a sample of the signal) from one location in a FIFO device to another location, for instance, and each delay element is used to temporarily store an audio signal sample, such as the signal $X_N$, so that the sample can be operated on by a filter element. Each of an RMS level detector, RMS.1 to RMS.N, is positioned at the output of each filter element F to detect the RMS value of the output of that filter element, which in this case is the RMS value of any one of the estimated echo signals $\hat{h}_0$ to $\hat{h}_N$. The RMS value detected by each of the RMS level detectors is sent to the filter control 420 where is it used as input to control the activation or deactivation of filter elements. The adaptive filter 400 also has a summer 440 that operates to sum together the estimate echo signals output by each of the active filters, $F_1$ to $F_{6+N}$, and the summed echo signal estimates are sent to a summation function 430 as a signal $\hat{h}_X$. The summed echo signal estimate $\hat{h}_X$ is subtracted in the summation function from a microphone signal $Y_N$ which results in an error signal $E_N$ which is sent to the filter control 420 and to a F.E. audio system (not shown). The filter control 420 uses the error signal $E_N$ and a sample of the F.E. signal $X_N$ to calculate an update coefficient value for each of the active filter elements.

Each of the active adaptive filter elements, $F_1$ to $F_{6+n}$ (hereinafter referred to as simply filter elements or filters F), shown in FIG. 4 can be controlled to receive as input an audio signal $X_N$ from a F.E. audio source and an update coefficient W generated at the filter control 420. Each of the filters F calculates an estimate $\hat{h}_N$ of the acoustic echo to be cancelled by convolving the input signal $X_N$ with the coefficient W, and this echo estimate $\hat{h}_N$ is the input to an addition function 440 which as described earlier adds together the echo estimates calculated by each of the active filters F. As described earlier, the output of the function 440 is an echo estimate $\hat{h}_X$ which is an input to a summation function 430. The summation function 430 also receives as an input a microphone signal $Y_N$ and operates to cancel the echo estimate $\hat{h}_X$ from the microphone signal $Y_N$ which results in an error signal $E_N$ that is an input to the filter control 420. The error signal is also sent to a F.E. audio system not shown.

Some or all of the filter elements $F_1$ to $F_{6+N}$ can be active at any point in time depending upon activity detected in at least one of the filter elements. For example, if filter elements $F_1$ to $F_6$ are currently active and if filter element $F_{6+N}$ is inactive, and if an RMS value, which is greater than a specified RMS threshold value, is detected at the output of the last active filter element $F_6$, then at least the filter element $F_{6+N}$ can be controlled to become active by the filter control 420. As a consequence of the filter control 420 activating a previously inactive filter element, such as the filter element $F_6$+N, it calculates and sends a filter coefficient W over line 431 to the newly activated filter element, and the filter element operates to calculate an echo estimate $\hat{h}_N$ using the coefficient and an audio signal $X_N$ received from the F.E. system. Alternatively, and depending upon how much greater the filter activity detected at filter element $F_6$ is than the specified threshold value, more than one filter element can be activated. So if it is determined that more than one additional filter element is required to cancel the acoustic echo in a microphone signal, then two or more filter elements can be activated by the filter control 420. Conversely, if the filter activity measured at filter element $F_6$ is less than a specified filter activity threshold value, and depending upon how much less than the threshold value the detected activity is, filter element $F_6$ and possibly one or more other currently active filter elements (not shown) can be controlled to be inactive.

Figure 5:
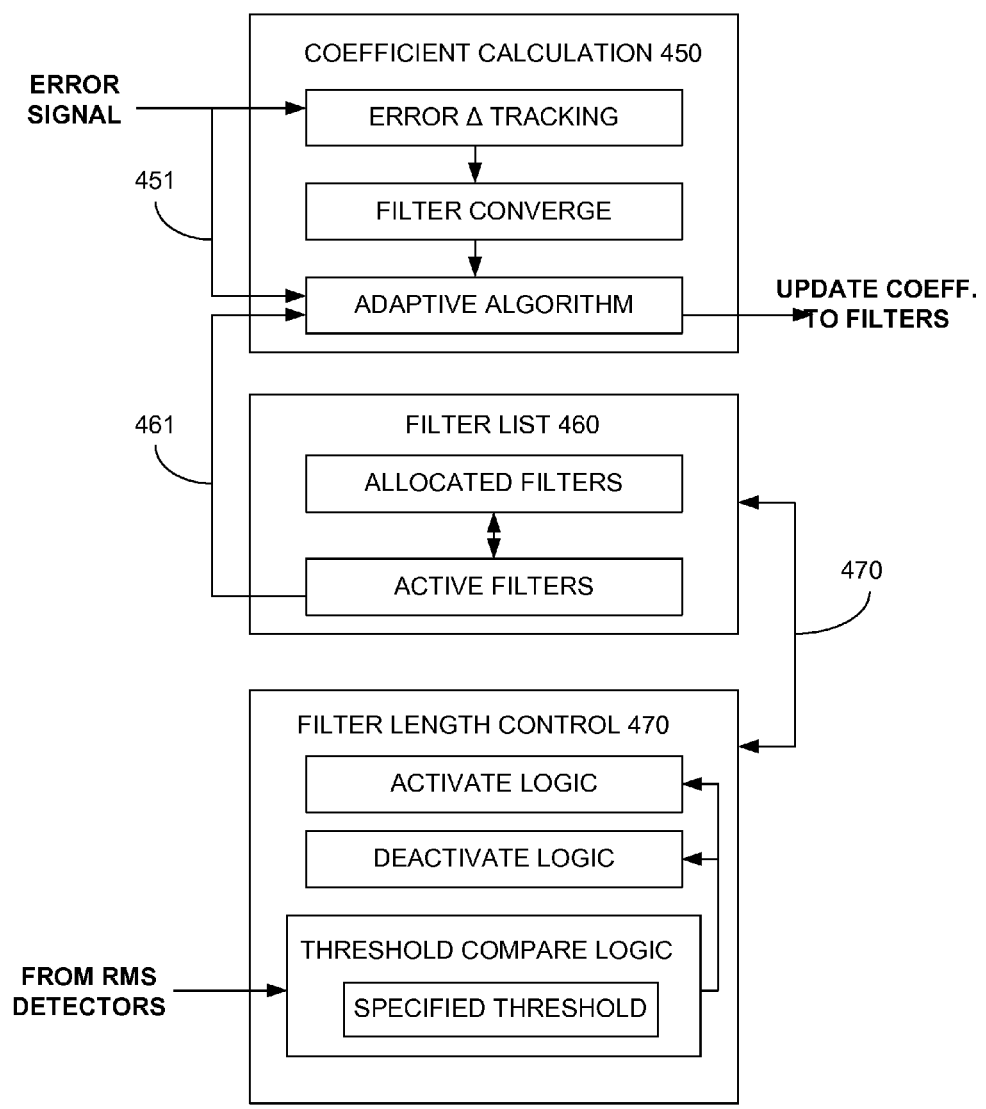
FIG. 5 is a diagram of an adaptive filter control module 420.

FIG. 5 is a diagram showing functional elements comprising the filter control 420. The filter control 420 has a coefficient calculation module 450, a listing of filter elements 460, and a filter length control module 470. Each of the functional modules comprising the filter control 420 can be implemented in specially designed computer code that can be stored in non-volatile memory in association with a digital signal processor (DSP) device for use by the DSP to perform certain operations on audio signals sampled in an audio conferencing system, such as the system in FIG. 1. More specifically, the coefficient calculation module 450 has an error change tracking function, a filter convergence detection function and an adaptive algorithm. The error tracking function operates to receive audio information in a current error signal from the summation function 430 in FIG. 4 over line 451, and to compare the audio information in the current error signal to audio information in at least one preceding error signal stored by the error tracking function. The result of this comparison is sent to the filter convergence function which determines, based upon the results of the error tracking function, that the adaptive filter 400 has converged to a solution or not. In the event that it is determined that the adaptive filter 400 has not converged, the convergence function controls the adaptive algorithm to continue to calculate update coefficients for each of the active filter elements using audio information in the current error signal. The filter listing 460 stores the identities of all filter elements that are defined and allocated for use by the adaptive filter 400 (this includes both active and inactive filter elements), and is stores the identities of all filter elements that are currently active. The coefficient calculation module 450 operates to periodically provide (each time an error signal is received) the adaptive algorithm with the identifies of all active filter elements stored in the filter list 460, and the active filter listing is updated with information received over line 470 from the filter length control module 470.

The filter length control module 470 in FIG. 5 has logic that determines whether one or more filter elements that are currently inactive should be activated, and logic that determines whether one or more filter elements that are currently active should be deactivated. Specifically, the filter length control 470 implement computer code that is designed to activate currently inactive filter elements and it implements computer code that is specially designed to deactivate currently active filter elements depending upon information provided by a threshold compare logic module. The threshold compare logic module can access threshold information specified by a user of the audio system comprising the adaptive filter 400 or any other individual with permission to do so. In one embodiment, the threshold information is one or more specified RMS values, with each of the values being specified in decibels (dB), but the threshold can be any suitable, quantifiable audio signal parameter. In the case that a threshold is specified to be −85 dB, and if a filter element activity is detected to be −75 dB, then the filter activation logic determines that at least one additional filter element can be activated and sends a message over line 470 to the filter list module 460 to update the active filter listing to include the identity of at least one currently inactive filter. Conversely, if a filter element activity is detected to be −90 dB, then the filter activation logic determines that at least one filter that is currently active can be deactivated. Depending upon the magnitude of the difference in value between the specified threshold and the detected filter activity, the filter control module 420 can be configured to activate/deactivate only one filter element or it can be configured to activate/deactivate more than one filter element at any point in time.

As described earlier with reference to FIG. 5, the adaptive filter 400 is specially designed to operate such that it is able to activate or deactivate filter elements (adjust the length of the adaptive filter) as needed in real time to cancel acoustic echo before it is sent back to a F.E. audio system. The number of filter elements that are active at any point in time is directly related to the time it takes the adaptive filter to converge to a solution. The adaptive filter 400 is controlled to only activate a number of filter elements that are necessary to substantially cancel acoustic echo in a microphone signal. According to one embodiment of the invention, the operation of the adaptive filter effectively minimizes the time it takes the adaptive filter to converge to a solution and allows it to effectively operate in a wide range of environmental conditions. The operation of the adaptive filter 400 to cancel acoustic echo from a microphone signal is described below with reference to the logical flow diagram shown in FIG. 6.

Figure 6:
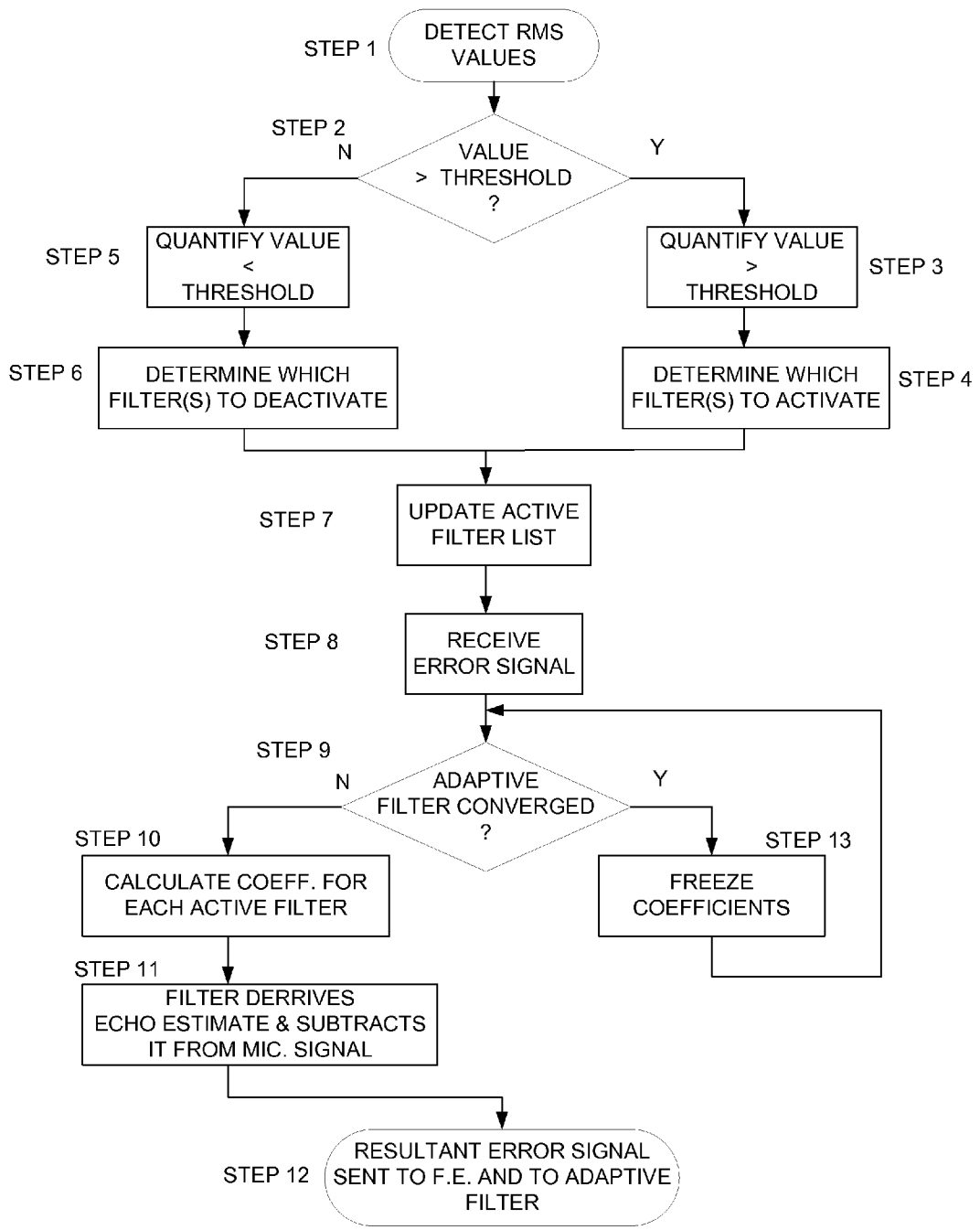
FIG. 6 is a logical flow diagram of the process of an embodiment of the invention.

In step 1 of FIG. 6, any one or more of the RMS detectors, RMS.1 to RMS.N, comprising the adaptive filter 400 detects and quantifies an RMS value at the output of a corresponding filter element $F_1$ to $F_{6+N}$, and sends a message, including the quantified RMS value, to the filter control 420. In step 2, the threshold compare logic comprising the filter length control 470 determines that the RMS value detected at the output of at least the last active filter element among the currently active filter elements is greater than, or less than or equal to a specified/stored RMS value (the threshold value), and if the value is greater than the threshold value, the process proceeds to step 3 at which point the amount that the detected RMS value that is greater than the threshold value is quantified, and the process proceeds to step 4 where a determination is made by the activation logic to activate one or more filter elements. Alternatively, in step 2 if the detected RMS value is less than or equal to the threshold RMS value, then the process proceeds to step 5, where the amount that the detected RMS value that is greater than the threshold value is quantified, and the process proceeds to step 6 where a determination is made by the deactivation logic to deactivate one or more filter elements. Depending upon the outcome of steps 4 and 6, the filter length control 470 sends a message over line 470 that includes information directing the filter list module 460, in step 7, to update the active filter list accordingly. In step 8, the coefficient calculation module 450 receives audio information in a current error signal over line 451 and compares the audio information in the current error signal to the audio information in the previous error signal received. The result of this comparison are sent to the filter convergence module and depending upon the results of the comparison of the current and previous error signals, the convergence module determines, in step 9, that the adaptive filter 420 has converged to a solution or not. If it is determined that the adaptive filter has converged to a solution, then the process proceeds to step 13 and the adaptive algorithm is prevented from calculating update coefficients. On the other hand, if in step 9 it is determined that the adaptive filter has not converged to a solution, the process proceeds to step 10 and the adaptive algorithm is permitted to calculate a new set of update coefficients, one coefficient of which is sent to each of one or more corresponding active filter elements. In step 11, each active filter elements uses the update coefficient to operate on a sample of an audio signal XN to calculate/derive an estimate of acoustic echo that is present in a microphone signal. The estimate of the acoustic echo is then subtracted from a microphone signal at the summation function 430, and the resulting signal (error signal) is sent to the filter control 420 and to a F.E. audio system.

The forgoing description, for purposes of explanation, used specific nomenclature to provide a thorough understanding of the invention. However, it will be apparent to one skilled in the art that specific details are not required in order to practice the invention. Thus, the forgoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

I claim:

1. In an audio system, a method for cancelling acoustic echo in a microphone signal, comprising:
    activating fewer than all of a plurality of filter elements allocated for use by an adaptive filter;
    detecting a filter element activity parameter in a last one of the activated filter elements to be greater than a specified threshold value, and activating at least a additional one of the plurality of filter elements allocated for use by the adaptive filter;
    calculating an adaptive filter coefficient for each one of the plurality of active filter elements, and each of the active filter elements using the calculated adaptive filter coefficient and audio information in a sample of a far end audio signal to calculate an estimate of an acoustic echo in a microphone signal; and
    the adaptive filter subtracting a sum of the estimates of the acoustic echo calculated by each of the active filter elements from the microphone signal.

2. The method of claim 1, wherein the audio system has two or more microphones.

3. The method of claim 2, wherein a separate adaptive filter is associated with each of the two or more microphones.

4. The method of claim 1, wherein the filter element activity parameter is a root-mean-squared value.

5. The method of claim 1, wherein the specified threshold value is a root-mean-squared value.

6. The method of claim 1, wherein the audio information in the sample of the far end audio signal comprises a transformed audio signal frequency component and a corresponding amplitude component.

7. In an audio system, a method for cancelling acoustic echo in a microphone signal, comprising:
    activating fewer than all of a plurality of filter elements allocated for use by an adaptive filter;
    detecting a filter element activity parameter in a last one of the plurality of active filter elements comprising an adaptive filter to be less than a specified threshold value and de-activating the last one of the currently active filter elements;
    calculating a different adaptive filter coefficient for each of the remaining plurality of active filter elements, and each of the remaining plurality of activate filter elements using the adaptive filter coefficient and audio information in a sample of a far end audio signal to calculate an estimate of an acoustic echo in a microphone signal; and
    the adaptive filter subtracting a sum of the estimates of the acoustic echo calculated by each of the remaining plurality of the active filter elements from the microphone signal.

8. The method of claim 7, wherein the audio system has two or more microphones.

9. The method of claim 8, wherein a separate adaptive filter is associated with each of the two or more microphones.

10. The method of claim 7, wherein the filter element activity parameter is a root-mean-squared value.

11. The method of claim 7, wherein the specified threshold value is a root-mean-squared value.

12. The method of claim 7, wherein the audio information in the sample of the far end audio signal comprises a transformed audio signal frequency component and a corresponding amplitude component.

13. An audio system for cancelling acoustic echo in a microphone signal, comprising:
    a loudspeaker operating to play a far end audio signal;
    a microphone operating to receive a near end audio signal and audio information corresponding to the far end audio signal played by the loudspeaker and received by the microphone over an acoustic path; and
    an adaptive filter having a plurality of active and inactive filter element operating to detect an activity parameter for at least a last one of the plurality of active filter elements comprising the adaptive filter to be less than a specified threshold value, and deactivating the last one of the plurality of currently active filter elements, calculating a different adaptive filter coefficient for each of the remaining plurality of active filter elements, each of the remaining plurality of activate filter elements using the adaptive filter coefficient and audio information in a sample of a far end audio signal to calculate an estimate of an acoustic echo in a microphone signal, and the adaptive filter subtracting a sum of the estimates of the acoustic echo calculated by each of the remaining plurality of the active filter elements from the microphone signal.

* * * * *